United States Patent Office 3,499,070
Patented Mar. 3, 1970

3,499,070
CASE HARDENING OF CONCRETE WITH FINE VERMICULITE
William R. Jackson, Greenville, S.C., assignor to W. R. Grace & Co., New York, N.Y., a corporation of Connecticut
No Drawing. Filed Apr. 20, 1966, Ser. No. 543,805
Int. Cl. C04b 41/30
U.S. Cl. 264—79                                          1 Claim

ABSTRACT OF THE DISCLOSURE

Cement-concrete with improved surface hardness is secured by covering the freshly deposited cement-concrete with a ¼–6-inch blanketing layer of exfoliated vermiculite in particle size passing 8–40 mesh U.S. screen size and maintaining the layer in contact with the concrete until the concrete has cured.

---

This invention relates to improvements in the case hardening of concrete. In one specific aspect, it relates to increasing the surface hardness of concrete with fine vermiculite.

In many commercial applications where a high surface hardness of concrete or cement is necessary, an excess of water on the surface during the setting period is detrimental to the final surface strength. For example, in dam spillways, a hard surface is necessary because of the constant attrition of the water as it flows over the spillway. In constructisg these dams, water in excess of the theoretical amount necessary for set, is needed to obtain a reasonable slump for pouring. However, this excess water is detrimental to the development of necessary maximum surface hardness.

A similar situation arises in placing sand and gravel concrete highway surfacing. Vibration is normally employed to densify and strengthen the main body of the concrete. This action brings water to the top surface in higher concentration than necessary for working the surface, and consequently causes the top surface of the roadway to be the weakest portion of the entire concrete mass.

It is therefore an object of this invention to provide a method for increasing the case hardening of concrete surfaces by reducing the concentration of water on the surface layer of the concrete mass.

This and other objects of the invention will become apparent from the following detailed description and specific examples. Broadly, this invention contemplates adding to the top surface of a concrete mass, prior to the initial set, a layer of fine sized exfoliated vermiculite.

The vermiculite functions as a water absorber in removing excess water from the surface. It also functions as a protective blanket to retard additional water loss beyond that required for setting, and insures that the surface will remain sufficiently damp to set properly.

The fine sized vermiculite has a particle size of 8 to 40 mesh (U.S. sieve sizes) with the preferred range being 20 to 60 mesh.

This invention is applicable to sand and gravel concrete mixes, portland cement mortars, and the like. The fine sized vermiculite can be applied to the cement surface in any convenient manner. Small areas can be covered manually, while large areas such as highways and spillways can be covered by machine spreaders.

Normally, ¼ inch to about 6 inches of fine sized vermiculite will be sufficient for most operations, but layers on the surface of the cement or concrete greater than 6 inches may be required in special instances.

It is a critical feature of this invention that the vermiculite be applied to the concrete surface as soon as possible after the concrete has been poured.

Vermiculite normally leaves a rough textured surface. This is particularly desirable on highways as an aid to increasing skid resistance. The superior case hardening of the concrete road surface imported by the use of this invention, increases the usefulness of the rough texture longer than is possible with present practices. The vermiculite layer also aids materially in reducing danger of concrete freezing in winter.

The efficiency of the vermiculite in drawing out the excess water from the top surface and maintaining the surface sufficiently damp to set properly can be improved through the addition of a wetting agent and/or calcium chloride to the vermiculite.

The invention is illustrated, but not limited by the following specific example.

EXAMPLE I

One part portland cement and three parts sharp sand (by volume) were mixed with sufficient water to form a dry, but pourable mix. Approximately equal portions of this mix were placed in clear, rigid, plastic tubes (3¼ inch high, 1$^{11}$⁄$_{16}$ inch diameter) filling about ½ of each tube. The tubes were vibrated to eliminate air pockets. One tube was filled with fine sized expanded vermiculite (Zonolite No. 4) giving a covering of about one inch over the unset mix. The other was left as is with no cover over the mix. Both tubes were allowed to set for two days, after which time it was noted that the vermiculite covering was wet to a depth of about ¼ inch above the surface of the concrete, indicating that the vermiculite had drawn water up from the concrete mass. The tubes were cut from the concrete samples and any vermiculite that adhered to the concrete surface was brushed off leaving a clean surface. The samples were then cured at ambient inside temperature for two months.

The surface hardness of the samples was tested using a ¼₀ square inch penetrating punch. The punch penetrated to a depth of 0.030 inch and the force necessary for the penetration was measured. Both the top and the bottom surfaces of the concrete samples were tested. The results were as follows:

Vermiculite cover.—The top surface of the cement required 81 pounds of force and the bottom surface 100 pounds of force to to penetrate 0.030 inch.

No vermiculite cover.—The top surface of the cement required only 25 pounds of force to penetrate 0.030 inch and the bottom surface only 56 pounds of force to penetrate to the same depth.

It is to be noted that in the samples which were covered by vermiculite, no fracture of the surface took place, while in those not covered one out of three samples broke.

These tests show the unobvious beneficial increase in surface hardness that can be gained by covering cement mortar with a layer of vermiculite. An additional unobvious result is the fact that vermiculite increase the hardness of the cement sample to a depth of one inch.

What is claimed is:

1. The process of curing and increasing the surface hardness of cement-concrete which includes covering the exposed surface of freshly deposited cement-concrete with a blanketing layer of particles passing 8–40 mesh, U.S. screen size, of exfoliated vermiculite, and maintaining the said layer of from ¼ of an inch to about 6 inches in thickness in contact with the concrete until the concrete has cured.

References Cited

UNITED STATES PATENTS

| | | | |
|---|---|---|---|
| 1,992,110 | 2/1935 | Wittenberg | 264—79 X |
| 2,853,928 | 9/1958 | Reardon | 264—79 X |
| 2,963,765 | 12/1960 | Tillman | 264—79 X |
| 1,859,253 | 5/1932 | Cross. | |
| 2,118,789 | 5/1938 | Fisher. | |
| 2,791,496 | 5/1957 | Rice. | |

FOREIGN PATENTS 957,684    5/1964    Great Britain.

ROBERT F. WHITE, Primary Examiner

K. J. HOVET, Assistant Examiner

U.S. Cl. X.R.

106—12; 264—333